3,316,124
PRODUCTION OF CATALYZED CARBON ELECTRODE
Marvin L. Kronenberg, Cleveland, Ohio, assignor to Union Carbide Corporation, a corporation of New York
Filed Apr. 15, 1963, Ser. No. 273,061
15 Claims. (Cl. 117—227)

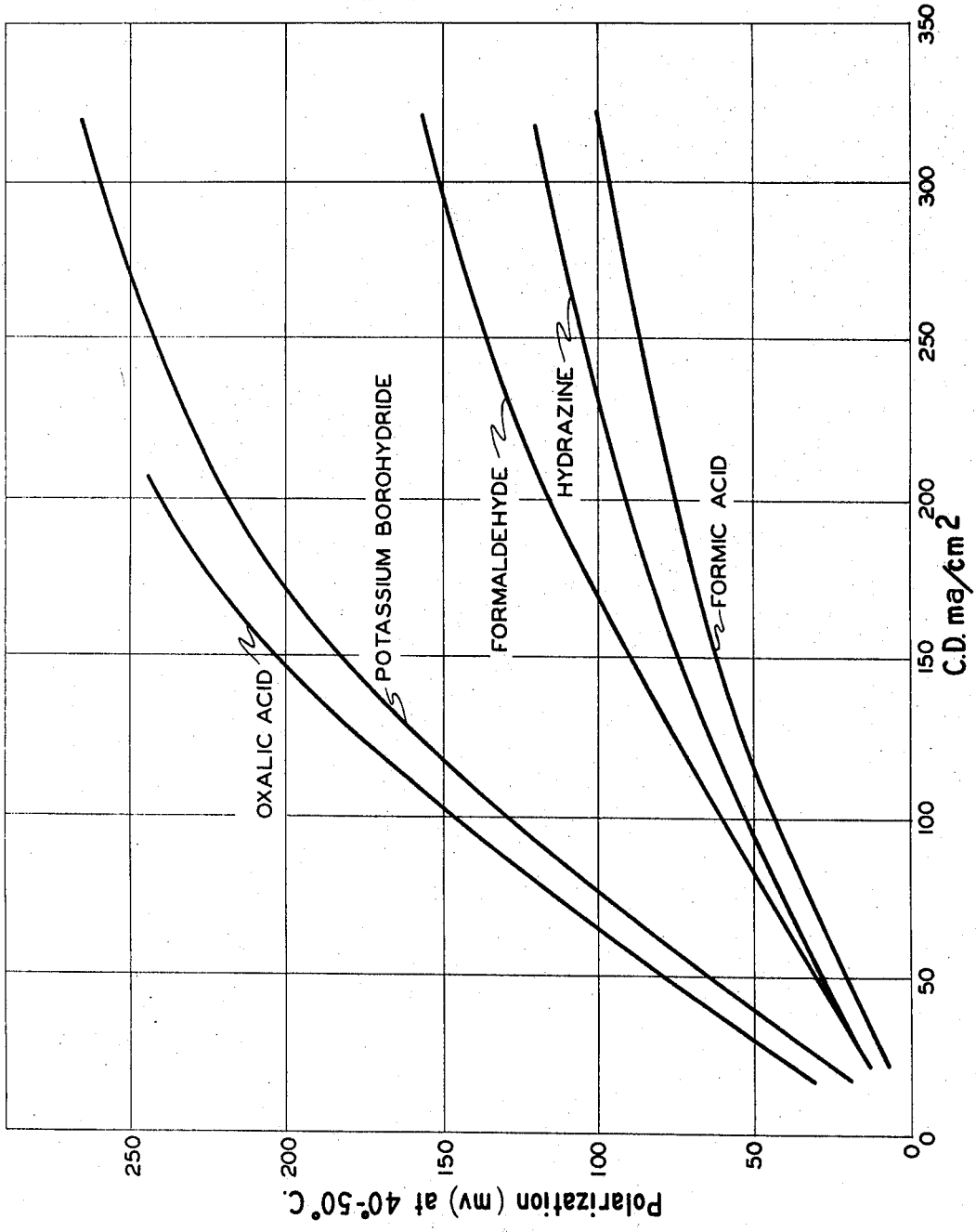

The present invention relates generally to the production of electrodes and, more particularly, to the production of catalyzed carbon electrodes suitable for use in fuel cells.

Heretofore, several difficulties have been encountered in the catalyzing of carbon electrodes. For example, in the case of carbon electrodes for use in fuel cells, a catalyst is usually applied to the surface of the electrode by coating the electrode with a solution of a noble metal salt and then decomposing the salt to deposit the active noble metal on the electrode. However, catalysts applied in this manner are often not uniformly distributed throughout the active surface layer of the electrode. Also, the catalyst may penetrate too deeply into the electrode and, therefore, lead to premature wetting and drowning of the electrode. Moreover, in many cases it is difficult to effect complete thermal decomposition of the metal salt because of the low threshold oxidation temperatures of activated carbon and the reaction products of the metal salt decomposition, and it is often impossible to wash away the residual salts because of the difficulty of access into the fine pore structures of the electrode. As a result, substantial quantities of the metal salt may remain both on the surface of the electrode and in the pores of the electrode, and will be gradually leached out during operation of the electrode.

If the catalyst is added as one of the final steps in the treatment of a molded or extruded electrode, it may be harmful to the wet proofing agent already present on the formed electrode. This is particularly true when the catalyzing solution contains certain organic solvents or other substances which rapidly attack the waterproofing agent.

It is, therefore, the main object of the present invention to provide an improved method for making catalyzed carbon electrodes.

It is a further object of the invention to provide a method for achieving uniform distribution of a cataylst throughout the desired portion of a carbon electrode.

It is another object to provide a method for accurately controlling the depth of penetration of a catalyzed layer in a carbon electrode.

It is a still further object to provide a method for achieving complete decomposition of the metal salt which provides the metal catalyst.

Still another object is to provide a method which permits the complete removal of the reaction products of the metal salt decomposition from the catalyzed carbon.

A further object is to provide a method for catalyzing carbon electrodes without affecting the electrode wetproofing.

Other aims and advantages of the invention will be apparent from the following description and appended claims.

In the drawing, the single figure is a graph showing the electrochemical properties of various electrodes produced by the present invention.

In accordance with the present invention, there is provided a method for making catalyzed carbon electrodes comprising preparing finely divided particles of activated carbon, catalyzing the particles of activated carbon by depositing a nobel metal catalyst on the particles while they are in a loose non-compacted form, and forming the catalyzed carbon particles into at least a portion of an electrode. The preferred method of depositing the noble metal catalyst on the carbon particles is by reacting thereon an alkaline solution of a noble metal salt and a reducing agent for the metal moiety of the salt in the alkaline solution.

By catalyzing the loose carbon particles before they are formed into an electrode, the present invention overcomes many of the problems encountered when the carbon is catalyzed after it has been formed into an electrode. For example, since the mass of carbon particles is in a loose non-compacted form which permits complete penetration of the catalyzing solution, the metal catalyst is distributed uniformly throughout the mass of carbon particles, and any residual salts and reaction products can be easily removed from the catalyzed carbon. Also, since the carbon is catalyzed before the wetproofing agent is added, there is no possibility of the catalyzing reactants harming the wetproofing. This invention also permtis the size and uniformity of the catalyzed region in the final electrode to be accurately controlled simply by controlling the placement of the pre-catalyzed carbon particles during the electrode-forming operation.

The carbon to be catalyzed by the process of the invention must be activated and must be in the form of loose, non-compacted, finely divided particles, such as carbon flour. The particle size of the carbon is not critical and depends mainly on the type of electrode to be formed therefrom, e.g., the desired pore size, the amount of binder employed, and the like.

The activated carbon particles are preferably catalyzed by reacting thereon an alkaline solution of a noble metal salt and a reducing agent for the metal moiety of the salt in the alkaline solution. The reducing agent reduces the metal moiety and deposits the noble metal as a catalyst on the carbon particles. This process can be used to deposit any of a number of known noble metal catalysts, the most useful which are cobalt, rhodium, iridium, palladium, platinum, silver, gold, ruthenium, and osmium. The choice of specific catalysts depends mainly on the intended use for the electrode to be made from the catalyzed carbon particles.

The subject invention is applicable to any noble metal salt which forms water soluble or gaseous reaction products. Chlorides are generally preferred, but many other salts such as acetates and nitrates are also suitable.

In general, any reducing agent can be employed which produces water soluble or gaseous reaction products and which is capable of reducing the metal moiety of the particular metal salt dissolved in the alkaline solution. The reducing agent must have a reduction potential above the reduction potential of the metal moiety to be reduced in the alkaline solution. Examples of reducing agents which are suitable for use with the aforementioned metals are hydrazine, formaldehyde, formic acid, oxalic acid, and potassium borohydrate.

Hydrazine is especially useful as a reducing agent in the present invention because it is an excellent reducing agent for the noble metals, and it produces reaction products which can be easily removed from the catalyzed carbon by volatilization or washing. The reaction of hydrazine and a noble metal salt in an alkaline solution may be illustrated as follows:

$$2PdCl_2 + N_2H_4 + 2KOH \rightarrow 2Pd + N_2 + 2HCl + 2KCl + 2H_2O$$

When the above reaction takes place in activated carbon particles, the palladium is deposited on the particles, the nitrogen is volatized, and the chlorides are easily removed by washing the carbon particles with water. Since there is no free chlorine formed, there is no problem with strongly adsorbed contaminants which are difficult to remove. Thus, hydrazine is a specially preferred reducing agent for the inventive method.

The same advantages described above for hydrazine can be attained by the use of closely related water soluble derivatives or water soluble salts of hydrazine. Examples of such materials are hydroxylamine ($NH_2OH$), hydroxylamine hydrochloride ($NH_2OH \cdot HCl$), hydrazine dihydrochloride ($N_2H_4 \cdot 2HCl$), hydrazine nitrate $$(N_2H_4 \cdot HNO_3)$$

and certain alkyl derivatives of hydrazine such as methyl and dimethyl hydrazine.

The reduction reaction of the noble metal salt and the reducing agents mentioned above is exothermic and generally goes to completion very rapidly at room temperature, especially in strongly alkaline solutions.

While the pH of the alkaline media for the noble metal salt and reducing agent is not critical, the reaction takes place much faster as the pH of the solution is increased. An alkaline media having a pH of at least about 10 is preferred for most reducing agents. The alkaline media may be KOH, $NH_4OH$, or any other alkaline media which produces volatile and/or water soluble reaction products with the particular noble metal salt and reducing agent employed. Of course, the alkaline solution may be diluted with water or other liquid media to achieve the desired pH and to dissolve the salt and reducing agent.

The proportion of noble metal salt to carbon particles in the alkaline solution depends mainly on the concentration of catalyst desired in the final catalyzed carbon particles. In the case of catalyzed carbon for use as the active surface layer of fuel cell electrodes, it is preferred to deposit the noble metal catalyst in a concentration of between about 0.5 and about 10 milligrams/cm.$^2$, suitably between about 1 and 6 milligrams/cm.$^2$. The proportion of reducing agent to noble metal salt in the alkaline solution is not critical, but it is generally preferred to have an excess of reducing agent over the needed for stoichiometric reaction with the metal salt, to insure complete reduction of the metal salt. Any excess amounts of the reducing agent are usually decomposed during the highly exothermic reaction. For example, a typical decomposition reaction for hydrazine is as follows:

$$3N_2H_4 \rightarrow 2NH_3 + 2N_2 + 3H_2$$

After the noble metal catalyst has been deposited on the carbon particles, the loose carbon particles should be thoroughly washed with water or another suitable solvent to remove the reaction products and any residual noble metal salt or reducing agent. After washing, the catalyzed carbon particles are dried, and are then ready for use in the formation of an electrode. The electrode may be formed by any of the conventional processes, such as by molding or extruding. The catalyzed carbon particles are generally used in only a portion of the electrode, such as in the active layer of a fuel cell electrode.

In an example of the present invention, five grams of activated carbon flour were mixed with five milliliters of saturated potassium hydroxide (KOH), three milliliters of a concentrated rhodium-palladium chloride catalyst solution five grams of solid hydroxylamine hydrochloride (about 42 weight percent of the entire mixture), and enough water to form a paste. The catalyst stock solution contained 9.8 grams rhodium chloride ($RhCl_3$) and 1.3 grams palladium chloride ($PdCl_3$) and 16 milliliters of water to a total volume of 20 milliliters. The reduction reaction occurred practically instantaneously, and the resulting catalyzed carbon flour was filtered, washed with water, and dried under a vacuum. The dry catalyzed carbon was then used to form the active surface layer on the electrolyte side of a molded carbon electrode. The following table illustrates the performance of the resulting electrode used as the anode in a hydrogen-oxygen fuel cell, compared with the performance of molded carbon electrodes in which the catalyst was incorporated after molding by other methods. The operating temperature was 50°–60° C., and the concentration of catalyst metal was approximately the same in each case.

| Test No. | Anode Reference Potential vs. Cd* | Current Density (ma./cm.$^2$) | Description and Comments |
| --- | --- | --- | --- |
| 1 | 0.19 volt | 30 | Palladium catalyst electroplated on carbon. Electrodes would not support higher currents. |
| 2 | 0.05 volt | 50 | Palladium chloride catalyst solution and wetproofing introduced under vacuum and then heated to 120° C. |
| 3 | 0.015 volt | 50 | Catalyst added to activated carbon by means of subject invention. |

*Anode-reference potential for $H_2$ vs. Cd=0.00 v. at open circuit; thus, the anode-reference values given above are a measure of deviation from open circuit potentials (polarization).

As can be seen from the above data, the polarization was lowest in the case of the hydrogen electrode made with the surface layer of carbon catalyzed in accordance with this invention (Test No. 3).

In another example of the invention, five grams of activated carbon flour were mixed with 10 milliliters of water, 5 milliliters of saturated potassium hydroxide, 2 milliliters of a concentrated rhodium-palladium chloride catalyst solution (same as in example above), and 10 milliliters of a solution of 5 percent hydrazine in water. The reaction occurred practically instantaneously, and the resulting catalyzed carbon flour was filtered, washed with water, and dried under a vacuum. The dry catalyzed carbon was then used to form the active surface layer on a molded carbon electrode for us in a fuel cell.

The performance of the resulting electrode was compared with that of a similar molded carbon electrode having its active surface layer made of uncatalyzed carbon and catalyzed after molding. The latter electrode was catalyzed by painting an alcohol solution of the rhodium and palladium chlorides on the surface of the electrode and then heating the electrode to deposit the noble metals. The catalyst metal concentration on the pre-catalyzed electrode was about 2.8 mg./cm.$^2$ and on the post-catalyzed electrode about 2.0 mg./cm.$^2$. The two electrodes were immersed in 13 N KOH solutions at 40° C. and were supplied with hydrogen. Each electrode was operated at 50 amperes per square foot against a standard carbon cathode supplied with oxygen. Anode potential measurements were made periodically with a zinc reference electrode. The electrochemical characteristics of the two anodes were similar for some time, but the post-catalyzed electrode failed at 1400 hours, while the pre-catalyzed electrode still showed no signs of failure after 1850 hours. The early failure of the post-catalyzed electrode was believed attributable to the presence of impurities such as chlorine or unreduced noble metal salts on the electrode. Examination of the post-catalyzed electrode showed signs of severe deterioration.

In a further example of the invention, five grams of activated carbon flour were mixed with 10 milliliters of water, 5 milliliters of 14 N KOH, 2 milliliters of a concentrated rhodium-palladium chloride catalyst solution (83% rhodium, 17% palladium); and 10 milliliters of 10% reducing agent in water. The reduction of the chlorides occurred practically instantaneously, and the resulting catalyzed carbon flour was filtered, washed with distilled water, and dried under vacuum. The dry catalyzed carbon was then used to form the active surface layers on molded carbon electrodes for use in fuel cells.

The aforedescribed procedure was followed with five different reducing agents: hydrazine, formaldehyde, formic acid, oxalic acid, and potassium borohydrate. Molded electrodes made from each batch of catalyzed carbon powder were then placed in similar hydrogen-oxygen fuel cells and operated for several hours at varying current densities against standard carbon cathodes supplied with oxygen. Anode potential measurements are plotted in the drawing, which shows the degree of polarization as a function of current density. As can be seen from the curves in the drawing, the use of formic acid, hydrazine, and formaldehyde as reducing agents produced better results than the use of oxalic acid and potassium borohydride. This example illustrates a simple empirical method for determining preferred reducing agents.

While various specific embodiments of the present invention have been described herein in some detail, it will be apparent that the same are susceptible of numerous modifications without departing from the scope of the invention. For example, while the invention has been described with particular reference to fuel cell anodes, it is equally applicable to fuel cell cathodes, as well as to catalyzed carbon electrodes for devices other than fuel cells.

What is claimed is:

1. A method for preparing catalyzed carbon powder suitable for use in the manufacture of catalyzed carbon electrodes, which method comprises preparing finely divided particles of activated carbon; catalyzing said particles of activated carbon by reacting thereon an alkaline solution of salt of at least one metal selected from the group consisting of cobalt, rhodium, iridium, palladium, platinum, silver, gold, ruthenium and osmium and a reducing agent for the metal moiety of said salt so as to deposit said metal as a catalyst on said carbon particles; and removing the reaction products from the catalyzed carbon particles.

2. The method of claim 1 wherein said metal catalyst is deposited on said carbon particles in a concentration of between about 0.5 and about 10 milligrams/cm.$^2$.

3. The method of claim 1 wherein said metal catalyst is deposited on said carbon particles in a concentration of between about 1 and about 6 milligrams/cm.$^2$.

4. The method of claim 1 wherein said finely divided particles of activated carbon are in a loose, non-compacted form.

5. The method of claim 1 wherein said alkaline solution has a pH of at least about 10.

6. The method of claim 1 wherein said alkaline solution contains an excess of said reducing agent over the amount required for stoichiometric reaction with said metal salt.

7. The method of claim 1 wherein said reducing agent is soluble in water and reacts with said metal salt to produce soluble and gaseous reaction products.

8. The method of claim 1 wherein said reducing agent has a reduction potential above the reduction potential of the metal moiety of said metal salt in said alkaline solution.

9. The method of claim 1 wherein said reducing agent is selected from the group consisting of hydrazine and its water soluble salts and derivatives.

10. The method of claim 1 wherein said reducing agent is formic acid.

11. The method of claim 1 wherein said reducing agent is formaldehyde.

12. A method for making catalyzed carbon electrodes comprising preparing finely divided particles of activated carbon; catalyzing said particles of activated carbon by contacting said particles with an alkaline solution of a salt of a metal selected from the group consisting of cobalt, rhodium, iridium, palladium, platinum, silver, gold, ruthenium, and osmium and a reducing agent having a reduction potential above the reduction potential of the metal moiety of said salt in said alkaline solution, thereby depositing said metal as a catalyst on said carbon particles; removing the reaction products and any residual salt from the catalyzed carbon particles by washing with water and then drying said particles; and forming the final catalyzed carbon particles into at least a portion of a carbon electrode.

13. The method of claim 12 wherein said catalyzed carbon particles form the surface layer of said electrode.

14. The method of claim 12 wherein said reducing agent is soluble in water and reacts with said metal salt to produce soluble and gaseous reaction products.

15. The electrodes produced by the method of claim 14.

References Cited by the Examiner

UNITED STATES PATENTS

| | | | |
|---|---|---|---|
| 1,288,722 | 12/1918 | Snelling | 136—121 X |
| 2,746,936 | 5/1956 | Plank | 252—410 X |
| 2,847,332 | 8/1958 | Ramadanoff | 117—227 |
| 3,198,667 | 8/1965 | Gladrow et al. | 117—227 |
| 3,212,930 | 10/1965 | Thompson et al. | 117—227 |
| 3,223,556 | 12/1965 | Cohn et al. | 136—121 X |

ALFRED L. LEAVITT, *Primary Examiner.*

WILLIAM L. JARVIS, *Examiner.*